(12) United States Patent
Reinke et al.

(10) Patent No.: US 11,427,697 B2
(45) Date of Patent: Aug. 30, 2022

(54) USE OF STEROLS FROM ANIMAL WASTE AS AN ADDITIVE IN ASPHALT BINDER

(71) Applicants: A.L.M. Holding Company, Onalaska, WI (US); Ergon Asphalt & Emulsions, Inc., Jackson, MS (US)

(72) Inventors: Gerald H. Reinke, La Crosse, WI (US); Gaylon L. Baumgardner, Arkadelphia, AR (US); Andrew Hanz, La Crosse, WI (US)

(73) Assignees: A.L.M. Holding Company, Onalaska, WI (US); Ergon Asphalt & Emulsions, Inc., Jackson, MS (US)

( * ) Notice: Subject to any disclaimer, the term of this patent is extended or adjusted under 35 U.S.C. 154(b) by 327 days.

(21) Appl. No.: 16/633,754

(22) PCT Filed: Jul. 24, 2018

(86) PCT No.: PCT/US2018/043387
§ 371 (c)(1),
(2) Date: Jan. 24, 2020

(87) PCT Pub. No.: WO2019/023172
PCT Pub. Date: Jan. 31, 2019

(65) Prior Publication Data
US 2020/0207944 A1 Jul. 2, 2020

Related U.S. Application Data

(60) Provisional application No. 62/537,169, filed on Jul. 26, 2017.

(51) Int. Cl.
| | |
|---|---|
| *C08K 5/05* | (2006.01) |
| *C08L 95/00* | (2006.01) |
| *E01C 7/22* | (2006.01) |
| *C04B 26/26* | (2006.01) |

(52) U.S. Cl.
CPC .............. *C08K 5/05* (2013.01); *C08L 95/005* (2013.01); *E01C 7/22* (2013.01); *C04B 26/26* (2013.01); *C08L 2555/20* (2013.01); *C08L 2555/60* (2013.01)

(58) Field of Classification Search
CPC ................................ C08K 5/05; C08L 95/00
USPC ........................................................ 524/379
See application file for complete search history.

(56) References Cited

U.S. PATENT DOCUMENTS

| | | | |
|---|---|---|---|
| 1,112,492 | A | 10/1914 | Turner |
| 2,280,843 | A | 4/1942 | Oliver et al. |
| 2,286,244 | A | 6/1942 | Whitacre et al. |
| 2,392,863 | A | 1/1946 | Rudd |
| 2,411,634 | A | 11/1946 | Pearson |
| 2,585,336 | A | 2/1952 | McCoy |
| 2,715,638 | A | 8/1955 | Albrecht et al. |
| 2,793,138 | A | 5/1957 | Wilkinson |
| 2,860,067 | A | 11/1958 | Crews et al. |
| 3,032,507 | A | 5/1962 | Wright |
| 3,691,211 | A | 9/1972 | Julian |
| 3,926,936 | A | 12/1975 | Lehtinen |
| 3,951,676 | A | 4/1976 | Elste, Jr. |
| 4,044,031 | A | 8/1977 | Johnansson et al. |
| 4,874,432 | A | 10/1989 | Kriech et al. |
| 5,437,717 | A | 8/1995 | Doyle et al. |
| 5,473,000 | A | 12/1995 | Pinomaa |
| 5,496,400 | A | 3/1996 | Doyle et al. |
| 6,057,462 | A | 5/2000 | Robinson et al. |
| 6,770,127 | B2 | 8/2004 | Kriech et al. |
| 6,987,207 | B1 | 1/2006 | Ronyak |
| 7,448,825 | B2 | 11/2008 | Kasahara et al. |
| 7,575,767 | B2 | 8/2009 | May et al. |
| 7,811,372 | B2 | 10/2010 | Nigen-Chaidron et al. |
| 8,513,338 | B2 | 8/2013 | Rodrigues |
| 8,696,806 | B2 | 4/2014 | Williams et al. |
| 8,741,052 | B2 | 6/2014 | Naidoo et al. |
| 9,481,794 | B2 | 11/2016 | Cox |
| 9,828,506 | B2 | 11/2017 | Grady et al. |
| 9,994,485 | B2 | 6/2018 | Warner et al. |
| 10,030,145 | B2 | 7/2018 | Severance et al. |
| 10,077,356 | B2 | 9/2018 | Fini |
| 10,167,390 | B2 | 1/2019 | Cox |
| 10,669,202 | B2 | 6/2020 | Reinke et al. |
| 10,793,720 | B2 | 10/2020 | Puchalski et al. |
| 10,961,395 | B2 | 3/2021 | Williams et al. |

(Continued)

FOREIGN PATENT DOCUMENTS

| | | |
|---|---|---|
| CA | 3 026 997 A1 | 12/2017 |
| CL | 2011002791 A1 | 4/2012 |

(Continued)

OTHER PUBLICATIONS

"B-Sitosterol from Soybeans" downloaded from http://www.mpbio.com/product.php?pid=02102886, May 21, 2015, 2 pages.
"Material Safety Data Sheet (Aug. 8, 2013)", Sylfat.TM. DP8, Arizona Chemical Company LLC, 7 pages.
"Product Data Sheet from MP Biomedicals Website", Catalog No. 102886, beta-Sitosterol, 2015, 1 page.
"Refining and Properties of Asphalt Binders", Asphalt Handbook, 7th Edition, 2007, 2 pages.
"Sylvaroad.TM. RP 1000 Performance Additive", Safety Data Sheet, Arizona Chemical Company LLC, Apr. 1, 2015, 7 pages.
"Tall Oil Fatty Acid", Ataman Kimya, retrieved on Aug. 10, 2021, 8 pages.

(Continued)

*Primary Examiner* — Deve V Hall
(74) *Attorney, Agent, or Firm* — Kagan Binder, PLLC

(57) ABSTRACT

Disclosed are asphalt binder compositions that contain at least one sterol or stanol additive, or blends of sterols and stanol additives, wherein the sterol or stanol additive is derived from an animal waste or manure source such as swine manure. These sterol and stanol-based additives improve various rheological properties of the asphalt binder compositions showing reduced and/or mitigated aging characteristics.

20 Claims, 1 Drawing Sheet

(56) References Cited

U.S. PATENT DOCUMENTS

| | | | |
|---|---|---|---|
| 11,097,981 | B2 | 8/2021 | Reinke et al. |
| 11,124,926 | B2 | 9/2021 | Fennell et al. |
| 11,168,214 | B2 | 11/2021 | Reinke et al. |
| 2003/0087789 | A1 | 5/2003 | Scheffler |
| 2003/0144536 | A1 | 7/2003 | Sonnier et al. |
| 2007/0122235 | A1 | 5/2007 | Kasahara et al. |
| 2007/0151480 | A1 | 7/2007 | Bloom et al. |
| 2010/0170417 | A1 | 7/2010 | Naidoo et al. |
| 2010/0190892 | A1 | 7/2010 | Binkley |
| 2010/0305342 | A1 | 12/2010 | Wong et al. |
| 2010/0319577 | A1 | 12/2010 | Naidoo et al. |
| 2012/0060722 | A1 | 3/2012 | Montpeyroux et al. |
| 2014/0234027 | A1 | 8/2014 | Morris |
| 2014/0338565 | A1 | 11/2014 | Severance et al. |
| 2015/0087753 | A1 | 3/2015 | Koleas et al. |
| 2015/0329702 | A1 | 11/2015 | Hwang et al. |
| 2016/0122507 | A1 | 5/2016 | Cox |
| 2016/0160453 | A1 | 6/2016 | Donelson |
| 2016/0362338 | A1* | 12/2016 | Reinke .................. C08L 91/00 |
| 2017/0370899 | A1 | 12/2017 | Porot et al. |
| 2018/0171146 | A1 | 6/2018 | Allen et al. |
| 2018/0209102 | A1 | 7/2018 | Baumgardner et al. |
| 2018/0215919 | A1 | 8/2018 | Reinke et al. |
| 2019/0152850 | A1 | 5/2019 | Warner et al. |
| 2019/0153229 | A1 | 5/2019 | Reinke et al. |
| 2019/0265221 | A1 | 8/2019 | Reinke et al. |
| 2020/0207944 | A1 | 7/2020 | Reinke et al. |
| 2020/0277497 | A1 | 9/2020 | Reinke et al. |

FOREIGN PATENT DOCUMENTS

| | | | | |
|---|---|---|---|---|
| CL | 2014002871 | A1 | 7/2015 | |
| CN | 103387749 | A | 11/2013 | |
| CN | 104245850 | A | 12/2014 | |
| CN | 104364318 | A | 2/2015 | |
| CN | 104629392 | A | 5/2015 | |
| CN | 110799597 | A | 2/2020 | |
| EP | 1 728 831 | A1 | 12/2006 | |
| GB | 575484 | A | 2/1946 | |
| JP | 2005-154465 | A | 6/2005 | |
| JP | 2012-093108 | A | 5/2012 | |
| JP | 2016-509611 | A | 3/2016 | |
| WO | 01/072315 | A1 | 10/2001 | |
| WO | 2004/016336 | A1 | 2/2004 | |
| WO | 2010/110651 | A1 | 9/2010 | |
| WO | 2010/128105 | A1 | 11/2010 | |
| WO | 2013/090283 | A1 | 6/2013 | |
| WO | 2013/163463 | A1 | 10/2013 | |
| WO | 2013/163467 | A1 | 10/2013 | |
| WO | WO-2013163463 | A1 * | 10/2013 | ............... C08K 3/34 |
| WO | 2014/047462 | A1 | 3/2014 | |
| WO | 2015/070180 | A1 | 5/2015 | |
| WO | 2016/073442 | A1 | 5/2016 | |
| WO | 2017/011747 | A1 | 1/2017 | |
| WO | 2017/027096 | A2 | 2/2017 | |
| WO | 2017/213692 | A1 | 12/2017 | |
| WO | 2017/213693 | A1 | 12/2017 | |
| WO | 2018/031540 | A1 | 2/2018 | |
| WO | 2018/144731 | A1 | 8/2018 | |
| WO | 2019/023172 | A1 | 1/2019 | |

OTHER PUBLICATIONS

"Tallex Pitch", Ingevity Holdings SPRL, Safety Data Sheet, Jul. 21, 2017, 12 pages.

"Wood Chemistry PSE 406/Chem E 470, Lecture 13, Diterpenes and Triterpenes", Wood Chemistry, 2015, 5 pages.

Allen, et al. (2013) "Microstructural Characterization of the Chemo-Mechanical Behavior of Asphalt in Terms of Aging and Fatigue Performance Properties", UMI Dissertation Publishing, Proquest LLC., 162 pages.

Anderson, et al. (1994) "Binder Characterization and Evaluation, vol. 3: Physical Characterization", SHRP-A-369, Strategic Highway Research Program, 4 pages.

Anonymous, (2001), "Standard Test Method for Determining the Flexural Creep Stiffness of Asphalt Mixtures Using the Bending Beam Rheometer (BBR)", ASTM D 6648-01, pp. 1-22, Retrieved from the Internet: http://www.eng.auburn.edu/research/centers/ncat/rap/files/meetings/05-10/aashto-draft-sp-ecs.pdf.

Anonymous, (2016), "The Use of REOB/VTAE in Asphalt (IS-235)", Asphalt Institute, pp. 1-87, Retrieved from the Internet: URL:http://www.asphaltinstitute.org/wp-content/uploads/IS235_REOB_VTAE_Asphaltinstitute.pdf (retrieved on: Mar. 20, 2017).

Arnaud, et al. (2009) "Digging into Asphaltenes", Analytical Chemistry, 87(38), downloaded from http://pubs.acs.Urg/cen/coverstory/87/8738cover.html, 7 pages.

ASTM D6521-13 (2013) "Standard Practice for Accelerated Aging of Asphalt Binder Using a Pressurized Aging Vessel (PAV)", ASTM International, 6 pages.

B-Sitosterol Powder, Supplier: MP Biomedicals, Printed from VWR Website, Date: Jun. 9, 2016,1 page.

Cantrill, Richard (2008) "Phytosterols, Phytostanols and Their Esters, Chemical and Technical Assessment", 69th JECFA, 13 pages.

Cao, et al. (2011) "Chemical Structures of Swine-Manure Chars Produced under Different Carbonization Conditions Investigated by Advanced Solid-State 13C Nuclear Magnetic Resonance (NMR) Spectroscopy", Energy Fuels, 25:388-397.

Cox, Russell Brian "Asphalt Binders Containing a Glyceride and Fatty Acid Mixture and Methods for Making and Using Same", U.S. Appl. No. 62/074,526, filed Nov. 3, 2014, 64 pages.

Endo, Yasushi (1990) "Minor Components in Edible Fats and Oils" Oil Chemistry, 39(9):611-617 (English Abstract on p. 611).

Farrar, et al. (2012) "Thin Film Oxidative Aging and low Temperature Performance Grading using Small Plate Dynamic Shear Rheometry: An Alternative to Standard RTFO, PAV, and BBR", 5th Eurasphalt & Eurobitume Congress, 10 pages.

Fini et al. (2012) "Application of Swine Manure in Development of Bio-Adhesive", Allen D. Leman Swine Conference, p. 244.

Fini, et al. (2010) "Characterization and Application of Manure-Based Bio-Binder in Asphalt Industry", Transportation Research Board 89th Annual Meeting, 14 pages.

Fini, et al. (2011) "Chemical Characterization of Biobinder from Swine Manure: Sustainable Modifier for Asphalt Binder", Journal of Materials in Civil Engineering, 23(11):1506-1513.

Fini, et al.(2011) "Application of Bio-Binder from Swine Manure in Asphalt Binder", Annual Meeting, 15 pages.

Hanz, et al. (2017) "Extended Aging of RAS Mixes with Rejuvenator," Binder expert Task Group Meeting, Aug. 10, 2016, 40 pages, retrieved from the internet: URL:https://www.asphaltpavement.org/PDFs/Engineering_ETGs/Binder_201609/06 Hanz Extened Aging of RAS Mixes with Rejuvenator.pdf., retrieved on Nov. 23, 2017.

Harhar, et al., "Chemical Characterization and Oxidative Stability of Castor Oil Grown in Morocco", Moroccan Journal of Chemistry, 4(2):279-284.

Hill, (2015) "The When, How and Benefits of Using Thinlays for Pavement Preservation", Equipment World, 9 pages.

Holmbom, et al., (1978), "Compostion of Tall Oil Pitch", Journal of the American Oil Chemist's Society, 55:342-344.

International Search Report and Written Opinion for International Application No. PCT/US2016/037077, dated Apr. 5, 2017, 20 pages.

International Search Report and Written Opinion for International Application No. PCT/US2016/064950, dated Apr. 19, 2017, 12 pages.

International Search Report and Written Opinion for International Application No. PCT/US2016/064961, dated Apr. 5, 2017, 23 pages.

International Search Report and Written Opinion for International Application No. PCT/US2017/045887, dated Dec. 8, 2017, 13 pages.

International Search Report and Written Opinion for International Application No. PCT/US2018/043387, dated Nov. 28, 2018, 17 pages.

(56) References Cited

OTHER PUBLICATIONS

International Search Report and Written Opinion for International Application No. PCT/US2018/055443, dated Jan. 31, 2019, 14 pages.
International Search Report and Written Opinion for International Application No. PCT/US2020/042202, dated Oct. 15, 2020, 24 pages.
Jarde, et al. (2007) "Using Sterols to Detect Pig Slurry Contribution to Soil Organic Matter", Water Air Soil Pollut, 178:169-178.
Kriz, et al. (2007) "Glass Transition and Phase Stability in Asphalt Binders", Road Materials and Pavements Design, 30 pages.
Logan, R.L., (Nov. 1979) "Tall Oil Fatty Acids", Journal of American Oil Chemists Society, 56:777A-779A.
Loughrin, et al. (2006) "Free Fatty Acids and Sterols in Swine Manure", Journal of Environmental Science and Health, Part B, 41:31-42.
Martin, et al. (2015) "The Effects of Recycling Agents on Asphalt Mixtures with High RAS and RAP Binder Ratios, Project N 9-58", National Cooperative Highway Research Program Transportation Research Board of The National Academics, pp. 1-184.
Material Safety Data Sheet, Catalog No. 102886, Revision date: Apr. 26, 2006, Product Name: beta-Sitosterol Practical Grade, 5 pages.
McSweeney, et al. (Jan. 1, 1987) "Composition of Crude Tall Oil & Fractionation Products (Chapter 2)" in "Tall Dil and Its Uses—II", Pulp Chemicals Association, 6 pages.
Mogawer, et al. (2012) "Performance Characteristics of High Rap Bio-Modified Asphalt Mixtures", Transportation Research Board 91st Annual Meeting, 16 pages.
Muhlen, et al., Introduction to Atomic Force Microscopy and its Application to the Study of Lipid Nanoparticles , Chapter 7 in Particle and Surface Characterization Methods, ISBN 3887630572, pp. 98-127.
Overney, et al. (1992) "Friction Measurement on Phase-Separated Thin Films with a Modified Atomic Force Microscope", Nature, 359:133-135.
Reinke, et al. (2015) "Further Investigations Into the Impact of REOB & Paraffinic Oils on the Performance of Bituminous Mixtures", Binder ETG Meeting, Fall River, MA, pp. 1-92.
Reinke, et al. (2017) "Extended Aging of RAS Mixes with Rejuvenator (An Update)", Binder Expert Task Group Meeting, May 4, 2017, retrieved from the internet: URL: https://www.asphaltpavement.org/PDFs/Engineering_ETGs/Binder_201705/1-2_Reinke&Hanz_UpdateExtendedAgingofRAS.pdf, retrieved on Nov. 23, 2017, 34 pages.
Reinke, et al. (2017) "Investigation of Sterol Chemistry to Retard the Aging of Asphalt Binders", Transportation Research Record, 2633:127-135.
Rossi, et al. (2017) "Adhesion Promoters in Bituminous Road Materials: A Review", Applied Sciences, 7(524):1-10.
Rowe, (2015), "Asphalt Modification", The 56th Illinois Bituminous Paving Conference, Champaign, Illinois, USA, pp. 1-42.
Rowe, (2016), "[Delta]Tc—Some Thoughts on the Historical Development," Binder ETG Meeting, pp. 1-43.
Rubab, et al. (2011) "Effects of Engine Oil Residues on Asphalt Cement Quality", Canadian Technical Asphalt Association Conference, 12 pages.
Sui, et al. (2010) "New Technique for Measuring Low-Temperature Properties of Asphalt Binders with Small Amounts of Material", Transportation Research Record, vol. 2179, Transportation Research Board, Washington, DC, pp. 23-28.
Sui, et al. (2011) "New Low-Temperature Performance-Grading Method: Using 4-mm Parallel Plates on a Dynamic Sher Rheometer," Transportation Research Record, 2207:43-48.
Takano, et al., (1999), "Chemical and Biochemical Analysis Using Scanning Force Microscopy", Chemical Reviews, 99 (10):2845-2890.
Verleyan et al. (2002), "Influence of the Vegetable Oil Refining Process on Free and Esterified Sterols," Journal of the American Oil Chemists' Society, 8 pages.
Verleyan et al. (2002), "Analysis of Free and Esterified Sterols in Vergetable Oils," Journal of the American Oil Chemists' Society, 7 pages.
Wakefield, Amma (Aug. 15, 2018) "ΔTc: A Parameter to Monitor Asphalt Binder's Kryptonite" Asphalt, 33(2):24-27.
Yan, et al., (2011), "Recovery of Phytosterols from Waste Residue of Soybean Oil Deodorizer Distillate", Soybean—Applications and Technology, 13 pages.
Zaumanis, et al. (2014) "Evaluation of Different Recycling Agents for Restoring Aged Asphalt Binder and Performance of 100% Recycled Asphalt", Materials and Structures, 48(8):2475-2488.

* cited by examiner

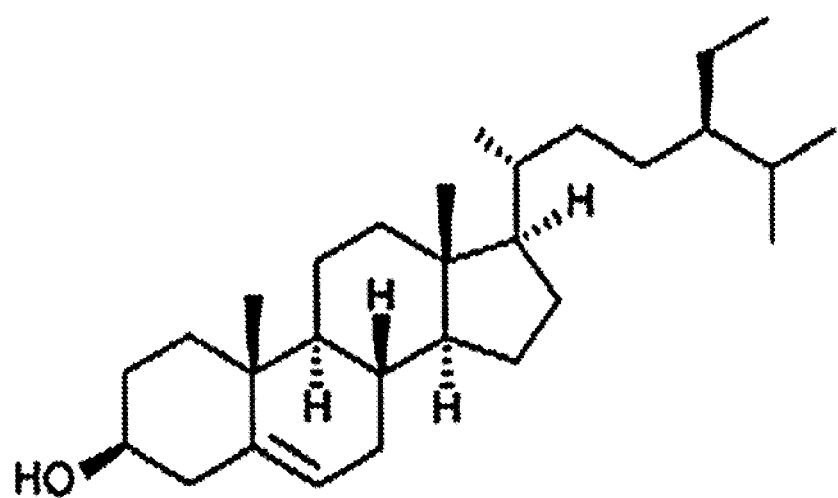

USE OF STEROLS FROM ANIMAL WASTE AS AN ADDITIVE IN ASPHALT BINDER

CROSS-REFERENCE TO RELATED APPLICATIONS

This application claims priority to International Application No. PCT/US/2018/043387, filed Jul. 24, 2018, which claims the benefit of U.S. Provisional Application No. 62/537,169 filed Jul. 26, 2017, wherein the contents of said applications are incorporated herein by reference in their entireties.

BACKGROUND

Asphalt pavement is one of the most recycled materials in the world, finding uses when recycled in shoulders of paved surfaces and bridge abutments, as a gravel substitute on unpaved roads, and as a replacement for virgin aggregate and binder in new asphalt pavement. Typically, use of recycled asphalt pavement is limited to sub-surface pavement layers or to controlled amounts in asphalt base and surface layers. Such uses are limited in part because asphalt deteriorates with time, loses its flexibility, becomes oxidized and brittle, and tends to crack, particularly under stress or at low temperatures. These effects are primarily due to aging of the organic components of the asphalt, e.g., the bitumen-containing binder, particularly upon exposure to weather. The aged binder is also highly viscous. Consequently, reclaimed asphalt pavement has different properties than virgin asphalt pavement and is difficult to process.

To reduce or retard the impact of asphalt aging on the long-range performance of asphalt pavement, numerous materials have been investigated. For example, rejuvenators are marketed with a stated goal of reversing the aging that has taken place in recycled raw materials such as reclaimed asphalt pavement and reclaimed asphalt shingles. It is unlikely that rejuvenation of asphalt can actually occur and the more likely scenario is that these additives may instead serve as softening agents for the virgin binders employed in asphalt compositions containing RAP and/or RAS. In some instances, 10% or more by weight of these softening agents are added to the virgin binder when such asphalt compositions are produced.

Aging can be assessed by measuring $\Delta Tc$, the difference between the stiffness critical temperature and the creep critical temperature after aging. The use of these softening agents can produce an asphalt mix with recovered binder properties that have acceptable values of $\Delta Tc$ after extended mix aging, but these acceptable binder properties after aging come at the cost of producing a mix that can be quite low in stiffness during the pavement's early life.

SUMMARY

This disclosure provides different embodiments of an asphalt binder composition containing an anti-aging additive. One embodiment is an asphalt binder composition comprising i) virgin asphalt binder, ii) reclaimed asphalt binder material comprising reclaimed asphalt pavement (RAP), reclaimed asphalt shingles (RAS) or combinations of both, and iii) about 0.5 to 15 wt. % of an anti-aging additive based on the virgin asphalt binder, wherein the anti-aging additive comprises at least one animal waste-derived sterol or stanol additive. In additional embodiments, the anti-aging additive is about 1 to 10 wt. %, or about 1 to 3 wt. %, of the virgin asphalt binder, and the anti-aging additive may comprise a blend of animal waste-derived sterol or stanol additive, a sterol or stanol additive derived from manure, a sterol or stanol additive derived from swine manure.

In other embodiments, the anti-aging additive comprises a blend of at least one animal waste-derived sterol or stanol additive and at least one sterol or stanol additive derived from a source other than animal waste.

In yet other embodiments, the asphalt binder composition may further comprise a softening agent such as, for example, re-refined engine oil bottoms.

In another embodiment, an asphalt binder composition comprises virgin asphalt binder, reclaimed asphalt binder material comprising RAP, RAS or combinations of both, and an anti-aging additive present in an amount effective to provide a less negative $\Delta Tc$ value after aging the asphalt binder composition compared to a similarly-aged asphalt binder without the anti-aging additive, wherein the anti-aging additive comprises at least one animal waste-derived sterol or stanol additive.

In yet other embodiments, the asphalt binder composition contains a Performance Graded binder with or without polymer modification. In other embodiments, the asphalt binder composition contains about 0.1 to 2 wt. % polyphosphoric acid based on total asphalt binder weight.

In some embodiments, the asphalt binder composition comprises about 1 to 10 wt. % anti-aging additive comprising at least one animal waste-derived sterol or stanol additive and about 1 to 8% wt. % bio-derived or petroleum-derived oil based on total asphalt binder weight. In additional embodiments, the asphalt binder composition containing the sterol or stanol additive and bio-derived or petroleum-derived oil is blended with recovered asphalt from torn off shingles or manufacturers' waste shingles.

In other embodiments, the asphalt binder composition containing the sterol or stanol additive and bio-derived or petroleum-derived oil may be used to produce a paving mixture containing about 10 to 70 wt. % RAP based on weight of the paving mixture, or containing about 1 to 7 wt. % RAS based on weight of the paving mixture.

Another disclosed embodiment is an asphalt binder composition comprising i) virgin asphalt binder, aged asphalt binder, or a combination of both, and ii) a blend of at least one first animal waste-derived sterol or stanol additive and at least one second sterol or stanol additive derived from a source other than animal waste, wherein a blend of at least one first animal waste-derived sterol or stanol additive and at least one second sterol or stanol additive derived from a source other than animal waste comprises a 10:90 to 90:10 weight ratio of at least one first animal waste-derived sterol or stanol additive and at least one second sterol or stanol additive derived from a source other than animal waste.

Still another disclosed embodiment is a paved surface comprising the asphalt binder composition of any of the embodiments set out above.

This disclosure also provides various embodiments of methods for changing or improving the physical characteristics of an asphalt binder composition.

One embodiment is a method for slowing the aging of, or restoring, an aged asphalt binder composition comprising adding an anti-aging additive comprising at least one animal waste-derived sterol or stanol additive an asphalt binder composition, wherein the asphalt binder composition comprises a virgin asphalt binder, reclaimed asphalt binder material comprising RAP (RAP), reclaimed asphalt shingles (RAS) or combinations of both.

Another embodiment is a method for retarding the aging of, or restoring, an aged asphalt binder comprising adding a blend of at least one first sterol or stanol additive and at least one second sterol or stanol additive to an asphalt binder composition, wherein the asphalt binder composition comprises a virgin asphalt binder, aged asphalt binder or a combination of both, and wherein the blend of first sterol or stanol additive and second sterol or stanol additive comprises a 10:90 to 90:10 weight ratio of first sterol or stanol additive to second sterol or stanol additive, and wherein at least one sterol or stanol additive is derived from animal waste such as, for example, swine manure.

Yet another embodiment is a method for reusing aged asphalt binder for asphalt pavement production, comprising adding a blend of at least one first sterol or stanol additive and at least one second sterol or stanol additive to an asphalt binder composition, wherein the asphalt binder composition comprises a virgin asphalt binder, aged asphalt binder or combination of both, and wherein the blend of first sterol or stanol additive and second sterol or stanol additive comprises a 10:90 to 90:10 weight ratio of first sterol or stanol additive to second sterol or stanol additive, and wherein at least one sterol or stanol additive is derived animal waste such as, for example, swine manure.

In some embodiments of this disclosure the aged asphalt binder composition comprises reclaimed asphalt binder such as, for example, reclaimed asphalt shingles or RAP.

Another disclosed method is a method for applying a road pavement using any of the disclosed asphalt binder compositions, wherein the disclosed asphalt binder composition is prepared, mixed with aggregate, applied to a base surface, and compacted.

BRIEF DESCRIPTION OF DRAWING

FIG. 1 depicts a representative sterol chemical structure.

DETAILED DESCRIPTION

Disclosed are compositions and methods that may retard or otherwise overcome the effects of aging in recycled or reclaimed aged asphalt binder so as to preserve or retain some or all of the original properties of the virgin binder or virgin asphalt originally used when laying down the aged asphalt. In some embodiments, the disclosed compositions and methods may alter the aging rate of the total asphalt binder present in a mix containing virgin asphalt binder and high levels of RAP or RAS. The disclosed compositions and methods use a class of sterols or stanol or both derived from animal waste. Representative sterols are a class of compounds like those depicted in FIG. 1. While such sterols do not contain the same number of condensed or partially unsaturated rings as asphaltenes found in asphalt binders, they do have the benefit of not being linear or branched linear molecules. The disclosed sterol or stanol additives may serve as anti-aging (i.e., age reducing or aging retarding) additives that help in the preservation, recycling and reuse of asphalt binder compositions. The asphalt binder compositions preferably are free of cyclic organic compositions that contain esters or ester blends. The disclosed asphalt binder compositions have particular value for the renewal of reclaimed asphalt, and especially RAP.

The disclosed asphalt binder compositions provide for recycled asphalt which may have improved physical and rheological characteristics such as reduced or less variable stiffness, improved effective temperature range, and improved low temperature properties. Some embodiments provide for the use of asphalt binder extracted from RAS. Certain embodiments provide for the addition of an additive to minimize potential detrimental low-temperature effects of recycled asphalt while allowing for higher stiffness at high temperatures.

Abbreviations, Acronyms & Definitions

The term "aged asphalt binder" refer to asphalt or binder that is present in or is recovered from reclaimed asphalt. Aged asphalt binder has high viscosity compared with that of virgin asphalt binder or virgin bitumen as a result of aging and exposure to outdoor weather. The term "aged binder" also refers to virgin asphalt or virgin binder that has been aged using the laboratory aging test methods described herein (e.g., RTFO and PAV). Aged asphalt binder may also refer to hard, poor-quality, or out-of-specification virgin binders that could benefit from addition of the disclosed additive; particularly virgin binders having a ring-and-ball softening point greater than 65° C. by the EN 1427 softening point test and a penetration value at 25° C. less than or equal to 12 dmm by the EN 1426 penetration test.

The terms "aggregate" and "construction aggregate" refer to particulate mineral material such as sand, gravel, crushed stone, crushed rock, or slag useful in paving and pavement applications.

The term "anti-aging additive" refers to a composition or mixture that is combined with aged binder (e.g., reclaimed asphalt) to restore or revitalize the aged binder and provide some or all of the original properties of virgin asphalt or virgin binder. In this disclosure an anti-aging additive includes sterols and/or stanols derived from animal waste and may include sterols and/or stanol derived from other sources such as plants. These sterols and/or stanols are enriched or concentrated from the naturally occurring source in order to provide an effective or preferred amount of sterols and/or stanols in the anti-aging additive.

The term "asphalt binder" refers to a binder material including bitumen and optionally other components that is suitable for mixing with aggregate to make a paving mix. Depending on local usage, the term "bitumen" may be used interchangeably with or in place of the term "asphalt" or "binder".

The term "asphalt pavement" refers to a compacted mixture of asphalt binder and aggregate.

The terms "asphalt paving mixture", "asphalt mix" or "mix" refer to an uncompacted mixture of asphalt and aggregate. Depending on local usage, the terms "bitumen mix" or "bituminous mixture" may be used interchangeably with or in place of the terms "asphalt paving mixture," "asphalt mix," or "mix".

The term "bitumen" refers to a class of black or dark-colored (solid, semisolid, or viscous) cementitious substances, natural or manufactured, composed principally of high molecular weight hydrocarbons, of which asphalts, tars, pitches, and asphaltenes are typical.

The term "crude" when used with respect to a material containing a sterol or mixture of sterols means sterol that has not been fully refined and can contain components in addition to sterol.

The terms "neat" or "virgin" as applied to asphalt binders are binders that have not been used or recycled such as Performance Grade binders.

The term "PAV" refers to a Pressurized Aging Vessel test. The PAV test simulates accelerated aging of asphalt using a pressurized aging vessel as described in ASTM D6521-13, Standard Practice for Accelerated Aging of Asphalt Binder Using a Pressurized Aging Vessel (PAV).

The term "pure" when used with respect to a sterol or stanol or mixture of sterols or stanol or both means having at least a technical grade of purity or at least a reagent grade of purity.

The terms "reclaimed asphalt" and "recycled asphalt" include RAP, RAS, and reclaimed asphalt from plant waste, roofing felt, or other asphalt-based products or applications.

The terms "reclaimed asphalt pavement" and "RAP" refer to asphalt that has been removed or excavated from a previously used road or pavement or other similar structure, and processed for reuse by any of a variety of well-known methods, including milling, ripping, breaking, crushing, or pulverizing.

The terms "reclaimed asphalt shingles" and "RAS" refer to shingles from sources including roof tear-off, manufacture's waste asphalt shingles, or post-consumer waste.

The term "RTFO" refers to a Rolling Thin Film Oven Test. This is a test used for simulating the short-term aging of asphalt binders as described in ASTM D2872-12e1, Standard Test Method for Effect of Heat and Air on a Moving Film of Asphalt (Rolling Thin-Film Oven Test).

The term "softening agent" refers to additives that ease (or facilitate) the mixing and incorporation of a recycled asphalt into fresh bitumen or into an asphalt mix, during an asphalt mix production process.

The term "sterol blend" refers to a composition, mixture or blend of two or more sterols that can be combined with aged binder (e.g., recycled or reclaimed asphalt) to retard the rate of aging of asphalt binder, or to restore or renew the aged binder to provide some or all of the original properties of virgin asphalt or virgin binder.

The term "ΔTc" refers to the difference between the stiffness critical temperature and the creep critical temperature. The stiffness critical temperature is the temperature at which a binder tested according to ASTM D6648 has a flexural creep stiffness value of 300 MPa and the creep critical temperature is the temperature at which the slope of the flexural creep stiffness versus creep time according to ASTM D6648 has an absolute value of 0.300. Alternatively the stiffness and creep critical temperatures can be determined from a 4 mm dynamic shear rheometer (DSR) test and analysis procedures described by Sui, C., Farrar, M., Tuminello, W., Turner, T., *A New Technique for Measuring low-temperature Properties of Asphalt Binders with Small Amounts of Material, Transportation Research Record: No 1681*, TRB 2010. See also Sui, C., Farrar, M. J., Harnsberger, P. M., Tuminello, W. H., Turner, T. F., *New Low Temperature Performance Grading Method Using 4 mm Parallel Plates on a Dynamic Shear Rheometer*. TRB Preprint CD, 2011, where the stiffness critical temperature is the temperature where the relaxation modulus equals 143 MPa and the creep critical temperature is where the absolute value of the slope of the relaxation modulus master curve versus relaxation time equals 0.275.

All weights, parts and percentages are based on weight unless otherwise specified.

Binders

Current bituminous paving practices involve the use of high percentages of RAP and RAS as components in the bituminous mixtures being paved. Typical RAP concentrations can be as high as 50% and RAS concentrations can be as high as 6% by weight. The typical bitumen content of RAP is in the range of 5-6% by weight and the typical bitumen content of RAS is in the range of 20-25% by weight. Consequently, a bituminous mixture containing 50% by weight of RAP will contain 2.5% to 3% RAP bitumen contributed to the final bituminous mixture and a bituminous mixture containing 6% RAS by weight will contain 1.2% to 1.5% RAS bitumen contributed to the final bituminous mixture. In many instances RAP and RAS recycled additives are combined in bituminous mixtures; for example 20% to 30% RAP and 5% to 6% RAS can be incorporated into a bituminous mixture. Based on the typical bitumen contents of RAP and RAS, bituminous mixtures containing 20% to 30% RAP and 5% to 6% RAS can result in 2% binder coming from the RAP and RAS combination to as much as 3.3% binder being derived from the RAP and RAS combination. Since a typical bituminous paving mixture will contain about 5.5% total bitumen there can be about 36% to as much as 60% of the total bitumen in the bituminous mixture being replaced from and supplied by these recycled sources.

In other embodiments, the binder includes a blend of virgin and other binders. In certain embodiments, the binder blend includes virgin binder and binder extracted from reclaimed asphalt. For example, the binder extracted from RAS material may be extracted from manufacturer asphalt shingle waste, from consumer asphalt shingle waste, or from a mixture of binders extracted from manufacturer and consumer asphalt shingle waste. In certain embodiments, a binder blend may include from about 60 wt. % to about 95 wt. % of virgin binder and from about 5 wt. % to about 40 wt. % of binder extracted from reclaimed asphalt such as RAS.

Characteristics of bitumen in these reclaimed sources and of virgin binders used in bituminous mixtures are shown in Table 1.

TABLE 1

| Bitumin type & source | High temperature stiffness grade, ° C. | Critical Low temperature grade based on 4 mm DSR Stiffness ° C., 20 hr. PAV | Critical Low temperature grade based on 4 mm DSR creep ° C. 20 hr. PAV | Critical Low temperature grade based on 4 mm DSR ΔTc° C., 20 hr. PAV | Critical Low temperature grade based on 4 mm DSR S-Critical Grade ° C., 40 hr. PAV | 4 mm DSR m-critical Grade ° C. 40 hr. PAV | ΔTc° C., 40 hr. PAV |
|---|---|---|---|---|---|---|---|
| PG 58-28 | 60.3 | −31.4 | −30.9 | −0.5 | −30.7 | −27.8 | −2.9 |
| PG 64-22 | 67.1 | −27.1 | −26.2 | −.9 | −25.8 | −23.2 | −2.6 |
| Binder recovered from RAP or RAS | | 4 mm DSR S-critical Grade | Critical Low temperature creep grade based on 4 mm DSR m-critical grade | ΔTc° C. | | | |

TABLE 1-continued

| Bitumin type & source | High temperature stiffness grade, °C. | Critical Low temperature grade based on 4 mm DSR Stiffness °C., 20 hr. PAV | Critical Low temperature grade based on 4 mm DSR creep °C. 20 hr. PAV | Critical Low temperature grade based on 4 mm DSR ΔTc° C., 20 hr. PAV | Critical Low temperature grade based on 4 mm DSR S-Critical Grade °C., 40 hr. PAV | 4 mm DSR m-critical Grade °C. 40 hr. PAV | ΔTc° C., 40 hr. PAV |
|---|---|---|---|---|---|---|---|
| RAP 03-16-15-D | 85.0 | −25.5 | −22.3 | −3.2 | | | |
| RAP 02-23-15-B | 89.5 | −25.3 | −21.3 | −4.0 | | | |
| RAP 03-24-15-D | 98.8 | −22.4 | −17.1 | −5.3 | | | |
| RAP 02-09-15-B | 87.5 | −27.8 | −26.2 | −1.6 | | | |
| RAS 04-03-15-D | 158.2 | −27.5 | −0.3 | −27.2 | | | |
| RAS 02-09-15-C | 137.7 | −25.7 | +9.7 | −35.4 | | | |

Table 2 shows the high and low temperature properties of blends produced with virgin binders and bitumen recovered from post-consumer waste shingles after different periods of aging, and without employing the presently disclosed anti-aging additives. Also shown in Table 2 are high and low temperature properties of mixtures containing RAP and RAS. Some of these mixtures have undergone extended laboratory aging and some of which are from field cores.

TABLE 2

| Binder recovered from RAP or RAS containing mixtures either lab or field aged | High temperature grade | Critical Low temperature stiffness grade based on 4 mm DSR | Critical Low temperature creep grade based on 4 mm DSR | ΔTc° C. |
|---|---|---|---|---|
| Field mix 09-27-13-F PG 58-28 + 5% RAS, unaged | 83.1 | −32.3 | −30.6 | −1.7 |
| Field mix 09-27-13-E PG 58-28 + 5% RAS, 5 day aged @ 85° C. | 102.8 | −28.5 | −23.9 | −4.6 |
| US Hwy 14 PG 58-28 + 6% RAS & 11% RAP, 10 day aged @ 85° C. | 85.4 | −30.9 | −24.1 | −6.8 |
| US Hwy 14 PG 52-34 + 6% RAS & 11% RAP, 10 day aged @ 85° C. | 80.8 | −35.6 | −29.9 | −5.7 |
| US Hwy 14 PG 58-28 + 31% RAP, 10 day aged @ 85° C. | 79.5 | −29.6 | −26.7 | −2.9 |
| Core from field paved 2011, cored 2013, binder from top ½ inch of core (mix contained PG 58-28 + 5% RAS or 22% shingle binder replacement) | 87.6 | −25.9 | −21.7 | −4.2 |
| Core from field paved 2011, cored 2013, binder from second ½ inch of core below the surface (mix contained PG 58-28 + 5% RAS or 22% shingle binder replacement) | 86.0 | −25.6 | −21.9 | −3.8 |
| Core from field paved 2011, cored 2013, binder from layer 2 inches below surface (mix contained PG 58-28 + 5% RAS or 22% shingle binder replacement) | 80.7 | −26.0 | −24.2 | −1.8 |

Tables 1 and 2 are meant to show the impact of incorporating high binder replacement levels of recycled materials, especially those derived from post-consumer waste shingles. The data are by no means exhaustive but do provide a basis of support for the necessity of incorporating additives into bitumen and bituminous mixtures that can mitigate the impact of the bitumen derived from these recycled components and also retard their impact on further oxidative aging of the total bitumen in the final mixture. Note the last three rows of Table 2, which show that the further away from the air-mixture interface, the less the impact on the parameter labeled ΔTc. As noted earlier, ΔTc is defined as the difference between the stiffness critical temperature and the creep critical temperature, and may be used to assess aging.

Research published in 2011 showed, based on recovered binder data from field cores, that when the ΔTc parameter, falls below −3° C. there is a danger of non-load related mixture cracking. Specifically a difference of −4° C. was construed as a warning limit and a difference of −5° C. was construed as a potential failure point.

Recently studies and reports at two Federal Highway Administration Expert Task Group meetings have shown a correlation between ΔTc values of binders recovered from field test projects and severity of pavement distress related to fatigue cracking. Additionally, it has been shown that when binders used to construct these field test projects were subjected to 40 hours of PAV aging, the ΔTc values showed a correlation to pavement distress related to fatigue cracking.

It is therefore desirable to obtain bituminous mixtures with bitumen materials that have a reduced susceptibility to the development of excessively negative values of ΔTc.

The data in Table 1 show typical virgin binders produced at refineries can maintain a ΔTc of −3° C. or less negative values after 40 hours of PAV aging. Further, the data in Table 1 show that binder recovered from RAP can have ΔTc values of −4° C. or more negative values which means that evaluation of the impact of high levels of RAP in new bituminous mixtures should be evaluated. Further, the excessively negative values of ΔTc for RAS recovered binders require additional scrutiny as to the overall impact of RAS incorporation into bituminous mixtures.

Table 2 shows that it is possible to extend this concept to mixture behavior by laboratory aging of the bituminous mixtures followed by recovery of the binder from the mixtures and determination of the ΔTc of that recovered binder. The long term aging protocol for bituminous mixtures in AASHTO R30 specifies compacted mix aging for 5 days at 85° C. Some research studies have extended the aging time to ten days to investigate extended aging. Recently, aging loose bituminous mixes at 135° C. for 12 and 24 hours and in some instances even for greater time periods have been presented as alternatives to compacted mix aging. The goal of these aging protocols is to produce rapid aging of the binders in these mixtures to the equivalence of field aging representative of more than five years in service and more desirably eight to 10 years in service. It has been shown for mixtures in service for eight years that the ΔTc of the recovered binders from the top ½ inch of pavement was more severe than 12 hours of PAV aging at 135° C. but less severe than 24 hours of PAV aging at 135° C.

The data in the first two rows of Table 2 show why long-term aging of mixtures containing recycled products is important. The binder recovered from the unaged mix (row 1) exhibited a ΔTc of −1.7° C., whereas the binder recovered from the 5 day aged mix exhibited a ΔTc of −4.6° C.

Anti-Aging Additives

The disclosed anti-aging additives preferably are used to alter (e.g., retard) an asphalt binder aging rate, or to restore and renew an asphalt binder (e.g., an aged asphalt binder).

In this disclosure anti-aging additives belong to the general class of sterols or stanols. The disclosed anti-aging additives can effectively work with asphaltenes in asphalt binder. These asphaltenes include extensive condensed ring systems with some level of unsaturation. The asphaltene content of typical binders can range from less than 10 wt. % to more than 20 wt. %. Asphaltenes are sometimes described as materials that are insoluble in n-heptane. An exact structure is unknown and based on the performance behavior of different binders it is unlikely that the asphaltene structure in any two binders is the same. Asphaltenes give a binder its color and stiffness and they increase in content as the binder ages. Consequently, the addition of RAP or RAS causes the asphaltene content to increase. Increasing asphaltene content along with other products of oxidation such as carbonyls and sulfoxides are responsible for the stiffening of bituminous mixtures and their ultimate failure. By their very chemical nature asphaltenes are not readily soluble in aliphatic chemicals. Aromatic hydrocarbons will readily dissolve asphaltenes and aromatic process oils have been used in recycled mixtures. However these oils may contain polynuclear aromatic compounds including listed potential carcinogens and therefore are not desirable additives. Most plant based oils are straight or branched chain hydrocarbons with some level of unsaturation and therefore are not as effective at retarding aging as they are at softening the overall binders in a mixture.

Animal waste represents a source of suitable sterols and/or stanols. Cow and poultry manure contains predominantly plant derived sterols and their reacted products such as cholesterol, campesterol, campestanol, sitosterol, and sitostanol ("*Use of Sterols to detect Pig Slurry Contributions to Soil Organic Matter*", E. Jarde, G. Gruau, L. Mansuy-Huault, P. Peu, J. Martinez, Water Air Soil Pollution (2007) 178:169-178.). Swine manure contains greater levels of cholesterol, coprostanol, epicoprostanol, as well as, sitosterol and sitostanol and other plant based sterol substances (Jarde et al). Further, the sterol content of lagoon sludge contains higher concentrations of sterol lipids relative to fatty acids than fresh manure (J. H. Loughrin and A. A. Szogi, "*Free Fatty Acid and Sterols in Swine Manure*", Journal of Environmental Science and Health, Part B, 41:31-42, 2006). Table 3 shows the percentage of total sterol on a dry weight basis for both fresh manure and lagoon sludge (Loughrin and Szogi).

TABLE 3

Swine Manure Sterol Content

| g/g dry weight | Lagoon Sludge | g/g dry weight | Fresh Manure |
| --- | --- | --- | --- |
| $6.76 \times 10^{-6}$ | 0.00068% | $1.81 \times 10^{-6}$ | 0.00018% |
| $3.64 \times 10^{-6}$ | 0.00036% | $1.11 \times 10^{-6}$ | 0.00111% |
| $3.50 \times 10^{-6}$ | 0.00035% | $4.93 \times 10^{-6}$ | 0.00005% |
| $8.86 \times 10^{-6}$ | 0.00089% | $1.10 \times 10^{-6}$ | 0.00011% |
| Average | 0.00057% | Average | 0.00036% |

Fresh manure that has been dried has an average wt. percent of sterol of 0.00036% based on four different reported samples the authors studied (Loughrin and Szogi). Lagoon sludge which has been dried has an average sterol content of 0.00057% by weight. Based on these data, adding even 50% dried manure to an asphalt binder to produce one ton (2000 lbs.) of a manure asphalt blend would only result in an approximate sterol content of 0.000285% in the final ton of manure plus asphalt binder mixture. Using dried manure is not a practical approach to produce a sterol or stanol additive to enhance asphalt binder performance. In this disclosure, 2.5% sterol by weight of asphalt binder is a reasonable lower limit for most applications from which to obtain improved age retarding performance in asphalt binder and 5% is an alternative preferred level for certain applications. To achieve this level of sterol content from swine or any other manure requires significant upgrading of the manure to remove or concentrate the sterol or stanol content to a much more practical level of about at least 30% sterol or stanol content in the final manure-based sterol or stanol additive. Levels of sterol or stanol greater than 30% would be desirable because obtaining a 2.5% loading of sterol or stanol from a 30% manure-based source would require the addition of 8.3% of the 30% sterol concentrate. More than three times the amount of sterol or stanol manure concentrate would have to be added to the asphalt binder to achieve the minimal level of sterol that is considered effective. Whether this additional manure based component is a functional additive to the asphalt binder is unknown in terms of overall asphalt performance. It would be more beneficial and effective to concentrate the sterol content in the manure to the highest practical level possible.

Past investigations using bitumen additives derived from manure, and more specifically swine manure, have focused on the production of a bio-binder from the entire swine manure waste stream. Swine manure waste was dewatered and then converted into the bio binder using a thermochemical liquefaction process that was used as a replacement of a fraction of the asphalt binder (E. Fini, E. Kalberer, and A. Shahbazi, "*Application of Bio-Binder from Swine Manure in Asphalt Binder*", Transportation Research Board Meeting, 2011 paper 11-3453). Mogawer found that 5% of the bio binder reduced the viscosity of the control binder, and the 5% bio binder was also found to reduce the mixture stiffness of the control mixture (PG 58-28+0% RAP and PG 58-28+ 40% RAP) compared to the test mixtures (PG 58-28+5% bio binder+0% RAP and PG 58-28+40% RAP) (W. O. Mogawer, E. H. Fini, A. J. Austerman, A. Booshehrian, and B. Zada, "*Performance Characteristics of High RAP Bio-Modified Asphalt Mixtures*", Transportation Research Board 2012 Annual Meeting). The addition of 5% bio binder changed the PG grade from PG 59.4-30.4 to PG 56.8-31.3 (Mogawer et al.). The rheological index (R-value) for the control was 1.578 and for the 5% bio binder blend was 1.553 (Mogawer et al.). This improvement in R-value indicates better relaxation; however, the R-value improvement was minor. As noted above, the amounts of this bio binder used in the reported study would not provide an effective amount of total sterol to provide anti-aging properties that are now disclosed.

Another potential source of sterols and/or stanols from manure is bio char, specifically the residue or char from hydrothermal carbonization. It is believed that the sterols or stanols present in the manure will be concentrated in the char remaining after hydrothermal carbonization. Hydrothermal carbonization char has substantially less moisture than the raw swine manure solids, about the same volatile content, and about 9% more fixed carbon. The pyrolysis char has less volatile matter, about 18% more ash, and about 3 times the amount of fixed carbon compared to the hydrothermal carbonization char. The pyrolysis char is indicated to be a good source of sterols (X. Cao, K. S. Ro., M. Chappell, Y. Li, J. Mao, "*Chemical Structures of Swine-Manure Chars Produced under Different Carbonization Conditions Investigated by Advanced Solid-State $^{13}C$ Nuclear Magnetic Resonance (NMR) Spectroscopy*", Energy Fuels 2011, 25, 388-397. These sterols have boiling points in excess of 250° C. at standard pressures and it is unlikely that the sterols would be carried over in the vapor phase. In contrast, most fatty acids would be vaporized at these reported pyrolysis temperatures.

In certain embodiments, the manure-derived sterol anti-aging additives may, for example, range from about 0.5 wt. % to about 15 wt. %, about 1 wt. % to about 10 wt. %, about 1 wt. % to about 3 wt. % of the weight of the virgin binder in an asphalt paving. In other embodiments, the binder can include the addition of from about 0.2 wt. % to about 1.0 wt. % anti-aging additive. The anti-aging additive has been shown to improve high and low temperature properties and PG grading for both low and high temperature ends of RAS-containing asphalt binder blends.

In some embodiments, the antiaging additive can alter or restore rheological properties in aged binders or recycled binders. In other embodiments, the anti-aging additive when used in an asphalt or asphalt pavement maintains a ΔTc value above −3° C.

The disclosed sterol or stanol blends can alter (e.g., reduce or retard) an asphalt binder aging rate, or can restore or renew an aged or recycled binder to provide some or all of the properties of a virgin asphalt binder. For example, sterol blends can alter or improve physical and rheological characteristics such as stiffness, effective temperature range, and low temperature properties of the asphalt binder.

In some embodiments, the crude sterol sources include stigmasterol, β-sitosterol, campesterol, ergosterol, brassicasterol, cholesterol and lanosterol or mixtures thereof. In some embodiments, the crude sterol sources include soy bean oil, corn oil, rice bran oil, peanut oil, sunflower seed oil, safflower oil, cottonseed oil, rapeseed oil, coffee seed oil, wheat germ oil, tall oil, and wool grease. In some embodiments the crude sterol includes a bio-derived source or partially distilled residue of the bio-derived source. In some embodiments, the crude sterol source includes tall oil pitch, soybean oil or corn oil. Exemplary sterols include sources that include known sterols such as cholesterol, campesterol, stigmasterol, β-sitosterol, Δ5-avenosterol, Δ7-stigasterol, Δ7-avenosterol, brassicasterol or mixtures thereof. In some embodiments, the anti-aging additive is derived from a source that includes β-sitosterol. In other embodiments, the anti-aging additive is derived from a source that includes a mixture of sterols. Other suitable sterols or stanol include modified or unmodified natural sources containing adequate quantities of sterols.

Sterols and/or stanols can also be obtained from a variety of sources other than animal waste. Plant sources of sterols and/or stanols are inexpensive in that they are the foots or tailings left from various manufacturing processes. Exemplary plant sources for sterols and/or stanols include tall oil pitch, crude tall oil, sugar cane oil, hot well skimmings, cottonseed pitch, soybean pitch, corn oil pitch, wheat germ oil or rye germ oil. In some embodiments, tall oil pitch is a source of the sterols and, or stanols. Tall oil pitch is obtained during the process of preparing paper from wood, particularly pine wood. Tall oil pitch is an extremely complex material that can contain rosins, fatty acids, oxidation products and esterified materials, an appreciable fraction of which are sterol esters. Tall oil pitch can include about 30% to 40% unsaponifiable molecules. Unsaponifiables are molecules that do not react with alkali hydroxides. Fatty and rosin acids remaining in the tall oil pitch readily react with potassium or sodium hydroxides and thus the unsaponifiables can be readily separated. It has been shown that 45% of the unsaponifiable fraction can include sitosterols. Therefore, a tall oil pitch sample can contain approximately 13.5% to 18% sterol molecules by weight. In some embodiments the crude sterol can have less than a food grade of purity (e.g., less than 85 wt. % sterols) or containing more than 85 wt. % sterols but also containing impurities or contaminants that render the material unsuitable for use in foods.

Any of the oil tailings or pitches from known plant sources are suitable sterol or stanol sources. U.S. Pat. No. 2,715,638, Aug. 16, 1955, to Albrecht, discloses a process for recovering sterols from tall oil pitch whereby the fatty acid impurities are removed by a neutralization process. Following this, the sterol esters are saponified; the free sterols are then recovered and washed with isopropanol and dried. If sufficiently purified, the recovered free sterols may be used as pure sterols rather than as crude sterols in the disclosed sterol blends.

In some embodiments a blended combination of at least one first sterol and/or stanol derived from animal waste and at least one second sterol and/or stanol derived from a source other than animal waste are added to the asphalt composition. In these embodiments, the blended combination the total amount of first and second sterols and/or stanols may, for example, range from about 0.5 wt. % to about 15 wt. %, or about 1 wt. % to about 10 wt. %, about 1 wt. % to about 3 wt. % of the virgin and/or aged binder in an asphalt composition. The blended combination of sterols and/or stanols may, in some embodiments, include a 10:90 to 90:10 ratio of at least one first sterol and/or stanol derived from animal waste and at least one second sterol and/or stanol derived from a source other than animal waste. The blended combination of sterols and/or stanols may, in some embodiments, include at least a 20:80, 30:70 or 40:60 ratio of at least one first sterol and/or stanol derived from animal waste and at least one second sterol and/or stanol derived from a source other than animal waste, and in some embodiments may include less than an 80:20, 70:30 or 60:40 ratio of at least one first sterol and/or stanol derived from animal waste and at least one second sterol and/or stanol derived from a source other than animal waste.

In some embodiments, the disclosed sterol or stanol, or combinations of sterols and stanols can alter, reduce or retard the degradation of rheological properties in binders containing recycled bituminous materials that include softening agents such as RAS, RAP, REOB, virgin paraffin or naphthenic base oils, untreated or non-refined waste drain oils or waste engine oil materials, vacuum tower asphalt extenders, paraffinic or naphthenic processing oils or lubricating base oils. In some embodiments, the sterol or stanol, or combination of sterols or stanols when used in an asphalt or asphalt pavement maintains a ΔTc value greater than or equal to −5° C. as the asphalt or asphalt pavement is aged. In some embodiments, the sterol or stanol, or combination of sterols or stanol provides an asphalt binder with a ΔTc of −5.0° C. or less negative values after 40 hours of PAV aging. In still other embodiments, the disclosed sterols or stanols, or combination of sterols and stanols provides an asphalt binder with a less negative ΔTc value and a decreased R-Value (both indicating reduced binder aging properties) following aging, when compared to a similarly-aged asphalt binder without sterols.

Softening Agents & Other Additives

Softening agents that may be used in binders include, for example, re-refined engine oil bottoms (REOB). REOB is a low cost softening additive and asphalt extender obtained from the residual material remaining after the distillation of waste engine oil either under vacuum or at atmospheric pressure conditions. The distilled fraction from the re-refining process is reprocessed into new lubricating oil for vehicles, but the bottoms do not have an available market due to the presence of metals and other particulates from internal combustion engines. Also these bottoms contain paraffinic hydrocarbons and additives incorporated into the original lubricating oil. For many years these bottoms were used by some companies as an asphalt extender, but the usage was localized.

Greater amounts of REOB are being produced and sold into the asphalt binder market. The use of REOB may provide mixtures having ΔTc values of −4° C. or lower with consequent poor performance in pavements after aging. When amounts of REOB are added to asphalt at levels as low as 5% by weight the resulting ΔTc after 40 hours PAV aging can be −5° C. or lower (e.g., more negative). Recovered binders from field mixes have been shown to contain REOB by means of metals testing and have shown greater distress than field mixtures of the same age and the same aggregate and paved at the same time but not containing REOB.

The disclosed anti-aging additives (e.g., the sterols and stanols) can mitigate the impact of REOB (for example as tested on 40 hours PAV) on ΔTc as well as retard the aging rate of the recycled asphalt.

The disclosed anti-aging additives can also be used to mitigate the impact of other softening agents. These other softening agents include virgin lubricating oils (such as MOBIL 1 and HAVOLINE™ 10W40 from Chevron USA Inc.), virgin paraffin base oils, and untreated or non-re-refined waste drain oils.

In addition to softening agents, the asphalt composition may contain other components in addition to the disclosed anti-aging additive. Such other components can include elastomers, adhesion promoters, rejuvenating agents and other suitable components.

Useful elastomers include, for example, ethylene-vinyl acetate copolymers, polybutadienes, ethylene-propylene copolymers, ethylene-propylene-diene terpolymers, butadiene-styrene block copolymers, styrene-butadiene-styrene (SBS) block terpolymers, isoprene-styrene block copolymers and styrene-isoprene-styrene (SIS) block terpolymers, chloroprene polymers (e.g., neoprenes) and the like. Cured elastomer additives may include ground tire rubber materials.

Adhesion promoters include a variety of materials that improve the asphalt binder chemical bond to aggregate. In some instances, adhesion promoters have been used to improve the asphalt binder chemical bond to damp or wet aggregate. There are a variety of known adhesion promoters such as the materials and additives reported in Rosssi, C. A., Teltayev, B., Angelico, "Adhesion Promoters in Bituminous Road Material: A Review", Appl. Sci. 2017, 7, 524.

Conventional rejuvenating agents are classified into types such as RA-1, RA-5, RA-25, and RA-75 as defined by ASTM D4552. Rejuvenating agents for use in the disclosed asphalt compositions may, for example, resemble the maltene fraction of asphalt such as an RA-1 rejuvenating agent, an RA-5 rejuvenating agent, or mixtures thereof. Exemplary rejuvenating agents are available from Holly Frontier under their HYDROLENE™ brand asphalt oils, from American Refining Group, Inc. under their KENDEX™ brand or from Tricor Refining, LLC under their Golden Bear Preservation Products RECLAMITE™ brand. Asphalt oils meeting ASTM standard D4552, and classified as RA-1 are suitable for harder asphalts, such as PG 64. RA-5, RA-25 and RA-75 oils may also be used with lower viscosity asphalts, such as PG 52. The rejuvenation agents can also include recycling agents that are rich in aromatics and resins, with small amounts of saturates.

The disclosed asphalt compositions can be characterized according to many standard tests, including ASTM specifications and test methods. For example, the disclosed compositions can be characterized using rheological tests (viz., dynamic shear rheometer, rotational viscosity, and bending beam).

At low temperatures (e.g., less than or equal to −10° C.), road surfaces need cracking resistance. Under ambient conditions, stiffness and fatigue properties are important. At elevated temperatures, roads need to resist rutting when the asphalt becomes too soft. Criteria have been established by the asphalt industry to identify rheological properties of a binder that correlate with likely paved road surface performance over the three common sets of temperature conditions.

The asphalt binder composition may be prepared by mixing or blending the sterol, stanol or sterol or stanol blend with the virgin binder to form a bituminous mixture or blend. The bituminous mixture or blend can be added to recycled asphalt (e.g., RAS and/or RAP) and aggregate. The preparation of asphalt compositions can be assisted by applying one or both of mechanical energy or thermal convection. In one aspect a method of preparing an asphalt composition involves mixing the asphalt with an anti-aging additive in addition to RAS or RAP at a temperature of from about 100° C. to about 250° C. In certain embodiments, the asphalt is mixed with anti-aging additive and RAS at a temperature of from about 125° C. to about 175° C., or 180° C. to 205° C. In some embodiments, the asphalt composition is mixed with asphalt, RAS, anti-aging additive and softening agent. In still other embodiments, the asphalt composition is mixed with asphalt, RAS, anti-aging additive and aggregate. The aggregate may be any of those known to be useful in the preparation of asphalt mixes such as, but not limited to, limestone, granite, and trap rock. The order of mixing the components of the asphalt composition is not limited. The composition may be prepared by mixing the binder with anti-aging additive followed by the addition of RAS and, in some cases the aggregate. The binder may also be mixed first with RAS, followed by addition of anti-aging additive and the aggregate. In yet another embodiment, the binder, anti-aging additive, and RAS are added together at the same time, followed by the addition of the aggregate. One of skill in the art will recognize that other sequences of adding and mixing components are possible.

To determine the ΔTc parameter, a 4 mm DSR test procedure and data analysis methodology from the Western Research Institute was employed as noted above. The DSR test procedure and methodology are also disclosed in International Application Nos. PCT/US16/37077 filed Jun. 10, 2016 PCT/US16/064950 filed Dec. 5, 2016, and PCT/US16/064961 filed Dec. 5, 2016, each of which is incorporated herein by reference in its entirety.

The ΔTc parameter can also be determined using a Bending Beam Rheometer (BBR) test procedure based on AASHTO T313 or ASTM D6648. It is important that when the BBR test procedure is used that the test is conducted at a sufficient number of temperatures such that results for the Stiffness failure criteria of 300 MPa and Creep or m-value failure criteria of 0.300 are obtained with one result being below the failure criteria and one result being above the failure criteria. In some instances for binders with ΔTc values less than −5° C. this can require performing the BBR test at three or more test temperatures. ΔTc values calculated from data when the BBR criteria requirements referred to above are not met may not be accurate. A typical 4 mm DSR test requires tests covering the range of temperatures from −42° C. or −36° C. to temperatures of 0° C. in increments of at least 6° C. such that data is always available that will satisfy the requirement to be above and below the 4 mm relaxation modulus failure criteria of 143 MPa and above and below the 4 mm m-value failure criteria of −0.275.

Pavement surface characteristics and changes in them can be revealed in an asphalt composition. These surface characteristics can be determined using atomic force microscopy (AFM). AFM is described for example in R. M. Overney, E. Meyer, J. Frommer, D. Brodbeck, R. Lüthi, L. Howald, H.-J. Güntherodt, M. Fujihira, H. Takano, and Y. Gotoh, *"Friction Measurements on Phase-Separated Thin Films with a Modified Atomic Force Microscope"*, Nature, 1992, 359, 133-135; E. zer Muhlen and H. Niehus, *"Introduction to Atomic Force Microscopy and its Application to the Study of Lipid Nanoparticles"*, Chapter 7 in *Particle and Surface Characterization Methods*, R. H. Muller and W. Mehnert Eds, Medpharm Scientific Pub, Stuttgart, 1997; and in H. Takano, J. R. Kenseth, S.-S. Wong, J. C. O'Brien, M. D. Porter, *"Chemical and Biochemical Analysis Using Scanning Force Microscopy"*, Chemical Reviews 1999, 99, 2845-2890.

AFM can be used to determine the effects of the sterol blends on an asphalt composition, and was used to determine the effects of pure sterols on asphalt compositions. Binders can be prepared for AFM by application of a small bead to a steel stub. With a knife, the bead can be scraped against the surface of the stub and the resulting film heated to 115° C. for about 2 minutes to allow the film surface to level. AFM images can be captured at room temperature on a Bruker Dimension Icon-PT™ Scanning Probe microscope. Both topographic and friction images can be obtained after the asphalt films have been annealed 72 hours to 96 hours at room temperature. Antimony doped silicon cantilever tip AFM probes (Bruker Corporation) can be used for measurements. Topographic images can reveal vertical elevations and declinations associated to surface features, whereas the friction image allows for differentiation of surface material based on changes in elastic or adhesive properties.

In some embodiments, a method for identifying aging in an asphalt composition and slowing the aging or restoring the aged asphalt includes analyzing an asphalt composition for the presence or absence of surface defects, wherein the asphalt is determined as aging if minimal surface defects are detected; and adding a sterol or stanol additive blend and virgin binder to the aged asphalt binder composition to reduce or slow the aging. In some embodiments, the aged asphalt compositions include recycled asphalts, softening agents, and rejuvenating agents. For example, some asphalt compositions include RAS, RAP, REOB, virgin paraffinic or naphthenic base oils, untreated or non-refined waste drain oils or waste engine oil materials, vacuum tower asphalt extenders, paraffinic or naphthenic processing oils and lubricating base oils. In some embodiments, the average roughness of an asphalt composition with sterol blend is 1.5 to 350 μm from 3.6 to 232 μm, or from 10 to 230 μm.

Exemplary examples and related data that show the anti-aging and restorative benefits of asphalt binder compositions containing anti-aging additives comprising amounts of a variety of one or more sterols are set out in International Application Nos. PCT/US16/37077 filed Jun. 10, 2016 PCT/US16/064950 filed Dec. 5, 2016, and PCT/US16/064961 filed Dec. 5, 2016. These data demonstrate the aging and restorative properties provided by the sterol additives, for example, critical ΔTc values, preferred concentrations, impact of aging and mitigation of aging due to the use of sterol, use of sterols and stanols as well as sterol or stanol blends.

The invention claimed is:

1. An asphalt binder composition comprising virgin asphalt binder, reclaimed asphalt binder material comprising reclaimed asphalt pavement, reclaimed asphalt shingles, or combinations of both and 0.5 to 15 wt. % of an anti-aging additive based on the virgin asphalt binder, wherein the anti-aging additive comprises at least one animal waste-derived sterol or stanol additive.

2. The asphalt binder composition of claim 1, wherein the anti-aging additive is 1 to 10 wt. %, or 1 to 3 wt. % of the virgin asphalt binder.

3. The asphalt binder composition of claim 1, wherein the anti-aging additive comprises a blend of animal waste-derived sterols.

4. The asphalt binder composition of claim 1, wherein the animal waste-derived sterol comprises a sterol derived from manure.

5. The asphalt binder composition of claim 4, wherein the manure is swine manure.

6. The asphalt binder composition of claim 1, wherein the animal waste-derived sterol comprises a stanol.

7. The asphalt binder composition of claim 1, wherein the anti-aging additive comprises a blend of at least one animal waste-derived sterol and at least one plant-derived sterol.

8. The asphalt binder composition of claim 1, wherein the anti-aging additive retards the aging rate of the asphalt binder composition compared to similarly aged asphalt binders that contain such asphalt binders but do not include the anti-aging additive and wherein the asphalt binders are aged using a pressure aging vessel (PAV) according to ASTM D6521-13 for 20 hours or more to provide a PAV-aged asphalt binder.

9. The asphalt binder composition of claim 1, wherein the asphalt binder composition provides a ΔTc that is less negative than −5.0° C.

10. A paved surface comprising the asphalt binder composition of claim 1.

11. A method for slowing the aging of or restoring aged asphalt binder comprising adding an anti-aging additive comprising at least one animal waste-derived sterol to an asphalt binder composition, wherein the asphalt binder composition comprises a virgin asphalt binder, reclaimed asphalt binder material comprising reclaimed asphalt pavement, reclaimed asphalt shingles, or combinations of both.

12. The method of claim 11, wherein the anti-aging additive is 1 to 10 wt. % of the virgin asphalt binder.

13. The method of claim 11, wherein the anti-aging additive comprises a sterol derived from manure.

14. The method of claim 13, wherein the anti-aging additive comprises a sterol derived from swine manure.

15. The method of claim 11, wherein the sterol comprises stanol.

16. The method of claim 11, wherein the anti-aging additive comprises a blend of at least one animal waste-derived sterol and at least one plant-derived sterol.

17. A method for retarding the aging of, or restoring, aged asphalt binder comprising adding at least one first sterol and at least one second sterol to an asphalt binder composition, wherein the asphalt binder composition comprises a virgin asphalt binder, aged asphalt binder, or combinations of both, and wherein the first and second sterols comprise a 10:90 to 90:10 weight ratio blend of first sterol to second sterol, and wherein at least one sterol is derived from manure.

18. The method of claim 17, wherein the sterol or stanol additive comprises swine manure or distilled residue of the swine manure.

19. The method of claim 17, wherein the asphalt binder composition provides a ΔTc that is less negative than −5.0° C.

20. A method for applying a road pavement using the asphalt binder composition of claim 11, wherein the asphalt binder composition is prepared, mixed with aggregate, applied to a base surface, and compacted.

* * * * *